United States Patent [19]

Chenebault et al.

[11] Patent Number: 4,663,252
[45] Date of Patent: May 5, 1987

[54] ELECTROCHEMICAL CELL WITH NEGATIVE ACTIVE MATERIAL BASED ON AN ALKALINE OR ALKALINE EARTH METAL

[75] Inventors: Philippe Chenebault, Poitiers; Didier Vallin, Smarves, both of France

[73] Assignee: Saft, S.A., Romainville, France

[21] Appl. No.: 831,608

[22] Filed: Feb. 21, 1986

[30] Foreign Application Priority Data

Mar. 5, 1985 [FR] France ............................. 85 03210

[51] Int. Cl.$^4$ ........................................... H01M 10/36
[52] U.S. Cl. ..................................... 429/101; 429/196
[58] Field of Search ................................ 429/101, 196

[56] References Cited

U.S. PATENT DOCUMENTS 3,073,884  1/1963  Pinkerton .
3,567,515  3/1971  Maricle .
4,362,794 12/1982  Abraham .
4,371,592  2/1983  Gabano ............................. 429/101
4,402,995  9/1983  Fleischer ........................... 429/101
4,403,021  9/1983  Domeniconi .
4,547,441 10/1985  Vallin et al. ........................ 429/196

FOREIGN PATENT DOCUMENTS 2493607  7/1982  France .

OTHER PUBLICATIONS

Patents Abstracts of Japan, vol. 8, No. 200 (E-266) [1637] 13 Sep. 1984, Nihon Denchi K.K.—Thionyl Chloride-Lithium Battery.

Primary Examiner—Donald L. Walton
Attorney, Agent, or Firm—Kenyon & Kenyon

[57] ABSTRACT

The electrochemical cell has an alkaline metal or alkaline earth metal negative active material, such as lithium, and an electrolyte comprising a solute and at least one solvent selected from the liquid oxyhalides group, which also serves as the positive active material. In accordance with the invention the electrolyte further contains an organic compound which has the effect of significantly reducing voltage delay.

9 Claims, 1 Drawing Figure

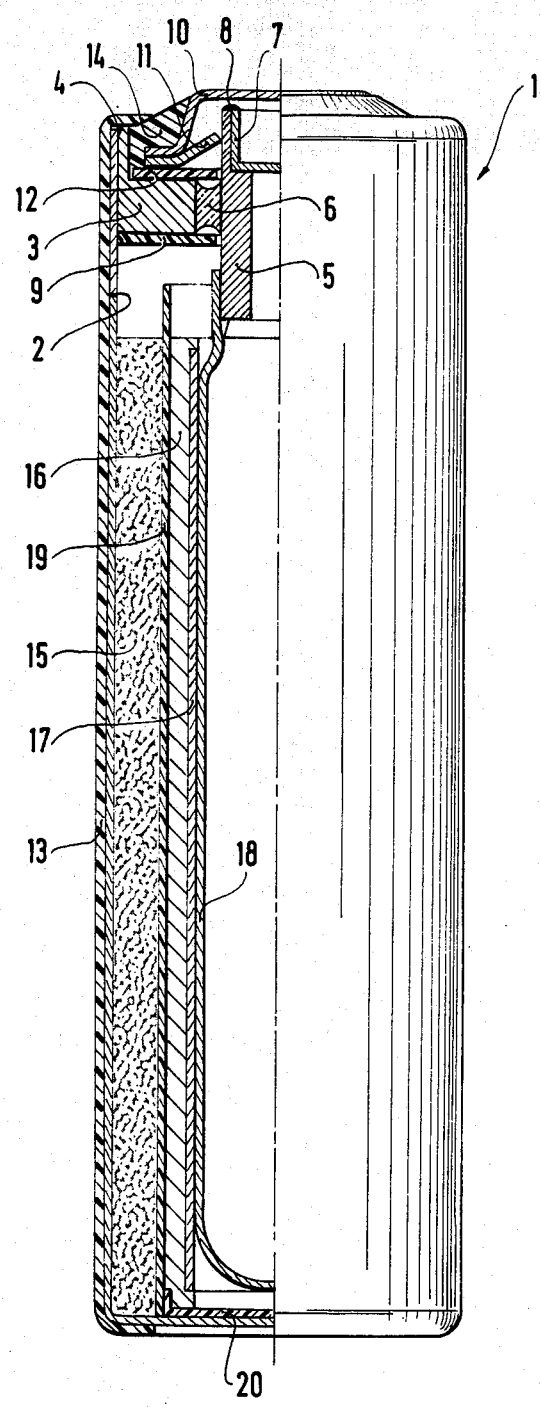

ELECTROCHEMICAL CELL WITH NEGATIVE ACTIVE MATERIAL BASED ON AN ALKALINE OR ALKALINE EARTH METAL

The present invention concerns an electrochemical cell in which the negative active material is based on an alkaline metal or an alkaline earth metal and the positive active material is a liquid oxyhalide such as thionyl chloride which also constitutes the electrolyte solvent, said electrolyte solvent possibly comprising other co-solvents.

When a cell of this kind is not being discharged, the liquid substance serving as the positive material and electrolyte solvent reacts with the metal of the negative electrode such that a protective film forms on the surface of the electrode. The existence of such a film is a disadvantage since it may cause a "voltage rise delay", also known simply as "voltage delay", at the start of discharge; in other words, the normal operating voltage is not obtained until after a certain time lapse. This phenomenon is all the more pronounced as the duration and temperature of storage are greater.

Various solutions have already been put forward to minimize this "voltage delay" effect.

For example, U.S. Pat. No. 4,309,940 published Jan. 5, 1982 describes a lithium-thionyl chloride cell the electrolyte solute whereof is a complex salt resulting from the action of lithium chloride LiCl on aluminum chloride $AlCl_3$, the latter being totally neutralized by LiCl to form $LiAlCl_4$. The patent provides for adding to the electrolyte a certain quantity of sulfur dioxide $SO_2$, the molar ratio of $ALCL_3$ to $SO_2$ being in the range of 0.9 to 1.5 to 1. This approach therefore entails the addition of substantial concentrations of sulfur oxide, which may result in cell pressurization phenomena and in practical implementation problems.

There have besides been proposed in U.S. Pat. No. 4,228,229 published Oct. 14, 1980 and French Pat. No. 2,485,271 published Dec. 24, 1981 other techniques employing partial or total neutralization of solutions of aluminum chloride by Lewis bases other than LiCl, namely, $Li_2O$ or $Li_2CO_3$, for example. These techniques have made it possible to achieve a significant improvement as compared with the initial electrolyte prepared by neutralizing a solution of $AlCl_3$ with LiCl. They yield solutions also containing sulfur dioxide $SO_2$. In this case it is generated "in situ" during the neutralization of $AlCl_3$ by the corresponding Lewis bases, but in proportions such that the $AlCl_3:SO_2$ molar ratio is greater than or equal to 2:1, according to the degree of neutralization selected.

As an example, and for reasons associated with cell self-discharge, totally neutralized electrolytes have been used ($AlCl_3:SO_2$ molar ratio of 2:1) with an $LiAlCl_4$ concentration of 1.35 mole/liter. The reaction used is, for example, as follows:

$$2AlCl_3 + Li_2O + SOCl_2 \rightarrow 2LiAlCl_4 + SO_2.$$

Although the solution explained hereinabove has resulted in significant improvements in terms of reduced voltage delays, it has nevertheless proved insufficient for a certain number of applications.

It is the object of the present invention to further reduce voltage delay.

The present invention consists in an electrochemical cell the negative active material whereof is based on an alkaline or alkaline earth metal and the electrolyte whereof comprises a solute and at least one solvent selected from among the liquid oxyhalides, said solvent also constituting the positive active material; said electrolyte additionally contains at least one organic compound of the alkaline or alkaline earth polyorganosulfatometallate type having the general formula:

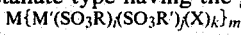

$$M\{M'(SO_3R)_i(SO_3R')_j(X)_k\}_m$$

$i + j + k$ being equal to n where:
- M stands for the said alkaline or alkaline earth metal and m its degree of oxidation,
- M' stands for M selected among Al, B, Ga, In, V, Sb, Nb, Si, W, Ta, n being its valence,
- R designates an organic radical of the alkyl, aryl, alkaryl or aralkyl type, with $0 \leq i \leq n$,
- R' designates an organic radical of the alkyl, aryl, alkaryl or aralkyl type, with $0 \leq j < n$, $i \neq 0$ if $j = 0$ and $j \neq 0$ if $i = 0$,
- and X is from the group including fluorine, chlorine, bromine and iodine, with $0 \leq k < n$.

For example, when $M = Li$, $M' = Al$, $R = CH_3$, the compound obtained has the formula $LiAl(SO_3CH_3)_4$.

When $M = Na$, $M' = Al$ and $R = C_2H_5$, the compound obtained has the formula $NaAl(SO_3C_2H_5)_4$.

When $M = Li$, $M' = Al$ and $R = CF_3$, the compound obtained has the formula $LiAl(SO_3CF_3)_4$.

The concentration of this organic compound is more than 0.01% by weight of electrolyte.

In accordance with a particularly advantageous embodiment, the negative active material is based on lithium and the said solvent is thionyl chloride $SOCl_2$; the solute consists of $LiAlCl_4$ and the organic compound has the formula $LiAl(SO_3CH_3)_4$.

According to one variant, the negative active material is based on sodium, said solvent consists of thionyl chloride, said solute consists of $NaAlCl_4$ and said organic compound has the formula $NaAl(SO_3CH_3)_4$.

The negative active material can also be based on calcium, magnesium and potassium.

The oxyhalide can also be phosphoryl chloride $POCl_3$, vanadyl trichloride $VOCl_3$, vanadyl tribromide $VOBr_3$, thionyl bromide $SOBr_2$, sulfuryl chloride $SO_2Cl_2$, chromyl chloride $CrO_2Cl_2$ or selenium oxychloride $SeOCl_2$ or mixtures thereof.

The electrolyte preferably further contains dissolved sulfur dioxide.

The said organic compound can be obtained by adding it directly to the electrolyte, or in situ by reacting the electrolyte with an organic compound having the formula $RSO_3H$, of the type of alkylsulfonic acid, or arylsulfonic, alkarylsulfonic or aralkylsulfonic acid, or with a mixture of these compounds or their anhydrides.

In accordance with one advantageous embodiment, methanesulfonic acid is used and the following reaction occurs:

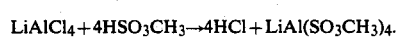

$$LiAlCl_4 + 4HSO_3CH_3 \rightarrow 4HCl + LiAl(SO_3CH_3)_4.$$

The hydrochloric acid formed can easily be eliminated by reflow heating.

Other characteristics and advantages of the invention will appear in the course of the following description of various embodiments thereof, which are mentioned as non-limiting examples. The single appended FIGURE is a schematic cross section of a cell according to the invention.

We have made several series of cells of the type shown in the figure. These cells, of cylindrical shape, have the following dimensions: height, 50 mm; outside diameter, 13.4 mm.

As illustrated, the cell 1 comprises a can 2 made of a composite sheet consisting of a stainless steel sheet and a nickel sheet laminated together, with the nickel sheet on the outside. The can closure comprises a stainless steel ring 3 welded at 4 to the edge of the can and electrically insulated from a ferro-nickel alloy cylinder 5 by a glass seal 6. The cylinder 5 is closed by a ferro-nickel alloy plug 7 which is welded to it at 8. A polytetrafluoroethylene disk 9 protects the ring 3 against chemical attack by the constituents of the cell.

The cell is thus hermetically sealed. It is terminated externally by a stainless steel cap 10 which covers the cylinder 5 and is in contact with a ring 11 which is force fitted over the cylinder 5. The ring 11 is insulated from the ring 3 by a polytetrafluoroethylene ring 12.

The can is surrounded by a polyvinyl chloride sheath 13 and the edges of the cap 10 are protected by a heat-setting resin 14.

The cathode collector 15 is a porous cylinder consisting of a mixture of 85% acetyline black with 15% polytetrafluoroethylene in contact with the can 2. The anode 16 consists of lithium foil wound onto the anode collector 17, itself consisting of a wound nickel mesh. A stainless steel spring 18 urges the anode towards the cathode collector 15, from which it is separated by a separator 19. A polytetrafluoroethylene disk 20 insulates the anode from the bottom of the can 2. The spring 18 is welded to the cylinder 5 so that the cap 10 constitutes the negative terminal of the cell, whose positive terminal is formed by the bottom part of the can 2 not protected by the sheath 13. The anode surface area facing the cathode collector is 10 cm².

Two types of solution serving both as electrolyte and positive active material have been introduced into the cell.

Electrolyte A: this is a prior art electrolyte obtained by neutralizing a solution of $AlCl_3$ in thionyl chloride by the Lewis base $Li_2CO_3$.

The reaction is as follows:

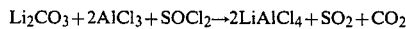

$$Li_2CO_3 + 2AlCl_3 + SOCl_2 \rightarrow 2LiAlCl_4 + SO_2 + CO_2$$

The concentration of $LiAlCl_4$ is 1.35 mole per liter.

Electrolyte B (according to the invention): a quantity of 0.5% by weight of electrolyte of tetramethanosulfatoaluminate of lithium $LiAl(SO_3CH_3)_4$ is added to electrolyte A.

We thus made two series of cells A, B both of which were stored for nineteen days at room temperature, then kept seven day and one month at 70° C. Twenty-four hours after their removal from the oven, the following tests were carried out:
  measurement of the impedance Z (in ohms) at 40 Hertz,
  discharge at ambient temperature into a 50 ohms resistor (current density substantially equal to 5 mA/cm²); the voltage U across the cell terminals was measured 0.3 second, 5 seconds and 60 seconds after initiating discharge.

The average results obtained are listed in the following tables.

| Cell | emf (volts) | Z (ohms) | U (0.3s) (volts) | U (5s) (volts) | U (60s) (volts) |
|---|---|---|---|---|---|
| After 19 days' storage at room temperature | | | | | |
| A | 3.673 | 188 | 2.44 | 2.75 | 2.99 |
| B | 3.670 | 22 | 3.17 | 3.42 | 3.40 |
| After 19 days' storage at room temperature, then 7 days at 70° C. | | | | | |
| A | 3.739 | 413 | 2.33 | 2.52 | 2.69 |
| B | 3.693 | 37 | 3.21 | 3.44 | 3.41 |
| After 19 days' storage at room temperature, then 1 month at 70° C. | | | | | |
| A | 3.757 | 566 | 2.00 | 1.88 | 1.90 |
| B | 3.710 | 51 | 3.28 | 3.41 | 3.37 |

The improvement afforded by the invention is readily apparent in these tables.

It will be understood that the quantities of organic compound have been given merely as an indication, the actual quantity can be anywhere within the range of 0.01% up to saturation in the electrolyte.

According to one variant, the lithium may be replaced by sodium; the solute is then advantageously $NaAlCl_4$ and the organic compound may be $NaAl(SO_3CH_3)_4$. However, it may equally be replaced by calcium or potassium.

In other embodiments employing a lithium anode, the solutes may be selected from the following formulas: $LiBCl_4$, $LiGaCl_4$, $LiInCl_4$, $LiVCl_4$, $LiSiCl_5$, $LiSbCl_6$, $LiNbCl_6$, $LiTaCl_6$ and $LiWCl_7$.

In the formulae for the additional organic compounds and solutes chlorine can be replaced by fluorine, bromine or iodine.

It will be understood that various changes in the details, materials and arrangements of parts which have been described herein as a way of explaining the nature of the invention may be made by those skilled in the art without departing from the scope of spirit of the invention as defined by the following claims.

We claim:

1. Electrochemical cell the negative active material whereof is based on an alkaline or alkaline earth metal and the electrolyte whereof comprises a solute and at least one solvent selected from among the liquid oxyhalides, said solvent also constituting the positive active material, wherein said electrolyte further contains at least one organic compound of the alkaline or alkaline earth polyorganosulfatometallate type having the general formula

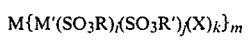

$$M\{M'(SO_3R)_i(SO_3R')_j(X)_k\}_m$$

with $i+j+k=n$,
in which:
  M is the said alkaline or alkaline earth metal and m its degree of oxidation,
  M' is selected from among Al, B, Ga, In, V, Sb, Nb, Si, W and Ta, n being its valence,
  R designates an organic radical of the alkyl, aryl, alkaryl or aralkyl type, with $0 \leq i < n$,
  R' designates an organic radical of the alkyl, aryl, alkaryl or aralkyl type, with $0 \leq j < n$, $i \neq 0$ if $j=0$ and $j \neq 0$ if $i=0$,
  X is selected from the group including fluorine, chlorine, bromine and iodine, with $0 \leq k < n$.

2. Cell according to claim 1, wherein the concentration of the said organic compound is greater than 0.01% by weight of electrolyte.

3. Cell according to claim 2, wherein the said electrolyte further contains sulfur dioxide.

4. Cell according to claim 2, wherein the said liquid oxyhalide is thionyl chloride, the said alkaline metal is lithium and the said solute has the formula $LiM'Cl_x$.

5. Cell according to claim 4, wherein the said electrolyte solute is constituted by lithium tetrachloroaluminate $LiAlCl_4$.

6. Cell according to claim 5, wherein the said organic compound is a lithium tetramethanesulfatoaluminate having the formula $LiAl(SO_3CH_3)_4$.

7. Cell according to any of the claims 4, 5 and 6, wherein the said electrolyte contains in addition sulfur dioxide, the molar ratio of M' to $SO_2$ being greater than 1.5:1.

8. Cell according to claim 2, wherein the said liquid oxyhalide is thionyl chloride, the said alkaline metal is sodium and the said solute is sodium tetrachloroaluminate $NaAlCl_4$.

9. Cell according to claim 8, wherein the said organic compound is a sodium tetramethanesulfatoaluminate according to the formula $NaAl(SO_3CH_3)_4$.

* * * * *